(12) United States Patent  
Khadiya

(10) Patent No.: US 7,874,147 B2
(45) Date of Patent: Jan. 25, 2011

(54) METHOD AND APPARATUS FOR A NON-CATALYTIC NOX REDUCTION

(75) Inventor: Navin Khadiya, Columbus, IN (US)

(73) Assignee: EMCON Technologies LLC

( * ) Notice: Subject to any disclaimer, the term of this patent is extended or adjusted under 35 U.S.C. 154(b) by 832 days.

(21) Appl. No.: 11/740,526

(22) Filed: Apr. 26, 2007

(65) Prior Publication Data

US 2008/0264042 A1 Oct. 30, 2008

(51) Int. Cl.
*F01N 3/00* (2006.01)
*F01N 3/10* (2006.01)

(52) U.S. Cl. .............................. 60/286; 60/274; 60/295; 60/300; 60/301; 60/303

(58) Field of Classification Search .................. 60/285, 60/286, 295, 303, 299, 300, 301, 273, 274
See application file for complete search history.

(56) References Cited

U.S. PATENT DOCUMENTS

| | | | | |
|---|---|---|---|---|
| 5,406,790 A | * | 4/1995 | Hirota et al. ................... | 60/276 |
| 6,357,226 B2 | * | 3/2002 | Borland ........................ | 60/298 |
| 2004/0058290 A1 | * | 3/2004 | Mauzey et al. ............... | 431/243 |
| 2007/0175205 A1 | * | 8/2007 | Robel et al. ................... | 60/286 |
| 2008/0163610 A1 | * | 7/2008 | Baird et al. .................... | 60/295 |

OTHER PUBLICATIONS

"How Computers Work: The CPU and Memory," Dec. 15, 2003, pdf pp. 1-3.*

* cited by examiner

*Primary Examiner*—Thomas E Denion
*Assistant Examiner*—Audrey Klasterka
(74) *Attorney, Agent, or Firm*—Pamela A. Kachur

(57) ABSTRACT

A method of reducing NOx in exhaust gases generated by an internal combustion engine includes advancing the exhaust gases along an exhaust path to a selective catalytic reduction (SCR) catalyst positioned downstream from the internal combustion engine. The method further includes activating a heat source if the exhaust gases are below a predetermined temperature, such that the exhaust gases along a segment of the exhaust path are heated to a temperature of 700-1000° C. The method further includes injecting a reductant into the segment of the exhaust path upstream of the SCR catalyst to react in the segment with NOx in the exhaust gases. The method further includes deactivating the heat source if the temperature of the exhaust gases at the catalyst rises above the first predetermined temperature. An emission abatement assembly is also disclosed.

20 Claims, 3 Drawing Sheets

METHOD AND APPARATUS FOR A NON-CATALYTIC NOX REDUCTION

FIELD OF THE DISCLOSURE

The present disclosure relates generally to emissions abatement, and more specifically to emissions abatement systems using non-catalytic NOx reduction.

BACKGROUND

Selective catalytic reduction (SCR) is used for the oxides of nitrogen (NOx) reduction in internal combustion engine exhaust. The efficiency of NOx reduction of an SCR catalyst is based upon the temperature of exhaust gases being exposed thereto. Exhaust gases are typically at low-efficiency temperatures during low-load conditions. Heat sources have been used to raise the temperature of the exhaust gases to a level allowing the SCR catalyst to perform more efficiently.

SUMMARY

According to one aspect of the disclosure, a method of reducing NOx in exhaust gases generated by an internal combustion engine includes advancing the exhaust gases along an exhaust path to a selective catalytic reduction (SCR) catalyst positioned downstream from the internal combustion engine. The method further includes activating a heat source if the exhaust gases are below a predetermined temperature, such that the exhaust gases along a segment of the exhaust path are heated to a temperature of 700-1000° C. The method further includes injecting a reductant into a segment of the exhaust path upstream of the SCR catalyst to react in the segment with NOx in the exhaust gases. The method further includes deactivating the heat source if the temperature of the exhaust gases at the catalyst rises above the first predetermined temperature.

According to another aspect of the disclosure, an emission abatement assembly comprises a temperature sensor configured to sense the temperature of exhaust gases generated by an internal combustion engine. The assembly further includes a heat source positioned along an exhaust path downstream of the internal combustion engine. The assembly further includes a reductant source. The assembly further includes an injector positioned along the exhaust path downstream of the internal combustion engine and configured to inject reductant from the reductant source. The assembly further includes a selective catalytic reduction (SCR) catalyst positioned along the exhaust path downstream of the heat source. The assembly further includes a controller electrically coupled to the temperature sensor, the heat source, and the injector. The controller includes a process and memory device each electrically coupled to the processor. The memory device includes a plurality of instructions stored therein, that, when executed by the processor, causes the processor to monitor the temperature of the exhaust gases through the temperature sensor. The processor is further caused to activate the heat source to raise the temperature of the exhaust gases along a segment of the exhaust path upstream of the SCR catalyst to a temperature of 700-1000° C. if the temperature of the exhaust gases is below a first predetermined temperature. The processor is further caused to operate the injector to inject reductant along the exhaust path segment to react in the segment with NOx present in the exhaust gases. The processor is further caused to deactivate the heat source if the temperature of the exhaust gases rises above the first predetermined temperature.

BRIEF DESCRIPTION OF THE DRAWINGS

The detailed description particularly refers to the accompanying figures in which.

DETAILED DESCRIPTION OF THE DRAWINGS

The following exemplary embodiments generally describe systems for reducing emissions in exhaust gases generated by an internal combustion engine. The systems may use a conventional selective catalytic reduction (SCR) catalyst to reduce NOx present in exhaust gases. However, during low-load periods, SCR catalysts are typically inefficient. During these periods, selective non-catalytic reduction can be used in which exhaust gases are heated along a segment of an exhaust path upstream of an SCR catalyst. Once the exhaust gases along the segment reach an adequate temperature, a reductant can be injected directly into the exhaust gases at the segment allowing the reductant to react with the NOx.

Figure 1:
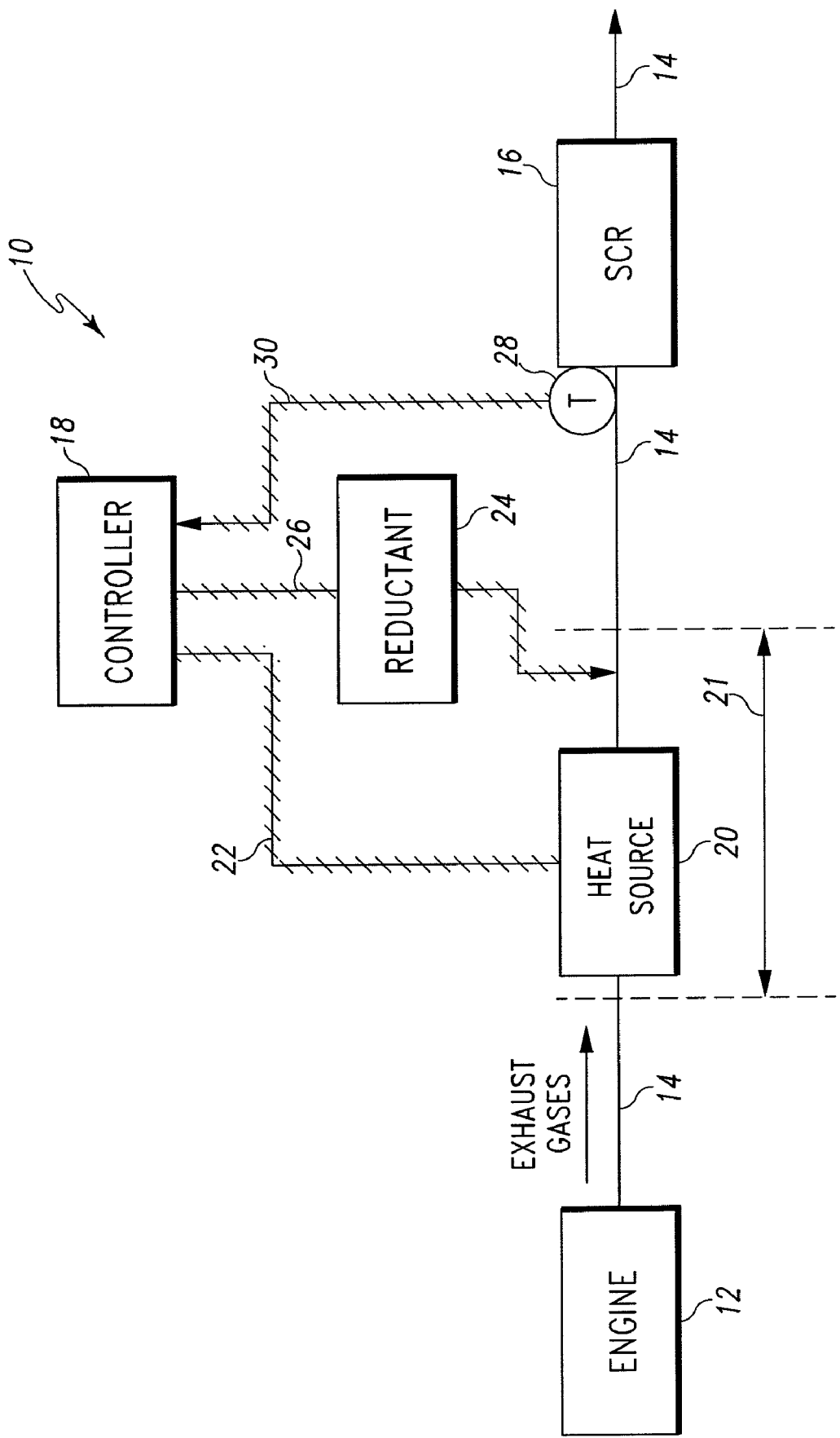
FIG. 1 is a diagrammatic view of an emissions abatement system.

As will herein be described in more detail, FIG. 1 shows an exemplary emission abatement assembly 10 configured to reduce NOx present in exhaust gases produced by an internal combustion engine, such as diesel engine 12. In the exemplary embodiment shown in FIG. 1, the emission abatement assembly 10 includes a selective catalytic reduction (SCR) catalyst 16 positioned along an exhaust path 14 that conducts exhaust gases generated by the engine 12. The assembly 10 also includes a reductant source 24 and a heat source 20 that are positioned along the exhaust path 14.

As previously discussed, catalysts, such as the SCR catalyst 16, are typically inefficient during low-load operating conditions in the engine 12 due to low exhaust temperatures, which can occur frequently on stop/go traffic vehicles or vocational vehicles, for example. Once exhaust gases produced by the engine 12 reach approximately 200 degrees Celsius, the catalyst 16 becomes more efficient in catalyzing the reaction between an administered reductant and NOx contained in the exhaust gases. The assembly 10 includes a temperature sensor 28 positioned along the exhaust path 14 upstream of the catalyst 16 that is used to sense the temperature of the exhaust gases entering the catalyst 16.

A controller 18 receives exhaust gas temperature data from the temperature sensor 28 through a data line 30. The exhaust gas temperature sensed by the sensor 28 can be compared to a predetermined threshold temperature, $T_1$, by the controller 18. When the engine 12 is operating at low-load conditions and the exhaust gases are below $T_1$, the controller 18 can activate a heat source 20. Once activated, the heat source 20 heats the downstream-moving exhaust gases such that the exhaust gases are heated to be substantially within a particular temperature range along a segment 21 of the exhaust path 14.

The heat source 20 can be controlled by the controller 18 so as to heat the exhaust gases within the segment 21 to a temperature high enough to create conditions that allow reductant to be injected directly into the exhaust gases for a non-catalytic reaction with NOx present in the exhaust gases. Thus, in this exemplary embodiment, the segment 21 provides a "zone" upstream of the catalyst 16 where selective non-catalytic reduction can take place. The reductant may continuously be injected into the exhaust gases along the segment 21 until the exhaust gases at the catalyst 16 reach the temperature $T_1$, which represents a temperature point at which the catalyst 16 is capable of efficiently catalyzing the reaction between the reductant and the NOx present in the exhaust gases.

In one exemplary embodiment, the heat source 20 is controlled to raise the temperature of the exhaust gases within the segment 21 to approximately 700-1000 degrees Celsius. It should be appreciated that the heat source 20 may be embodied by various devices and methods such as a fuel-fired burner, for example. One such exemplary fuel-fired burner is disclosed in U.S. Pat. No. 7,025,810, which is incorporated by reference herein. Other exemplary heating devices, such as an electric heater, may be used as a heat source 20 as well.

It should be further appreciated that various reductant sources 24 may be used for supplying reductant to react with NOx. In one exemplary embodiment of the assembly 10, the reductant source 24 can be a source of urea to be used as a reductant. In another exemplary embodiment, the reductant source 24 can be a fuel reformer, which provides reformate gas to react with the NOx present in the exhaust gases. In another exemplary embodiment, the reductant source 24 can be an ammonia generator, such as that disclosed in U.S. Patent App. Pub. No. 2006/0201139, which is incorporated by reference herein. Other ammonia generators can also be implemented such as that disclosed in U.S. Pat. No. 7,062,904, which is also incorporated by reference herein.

Figure 2:
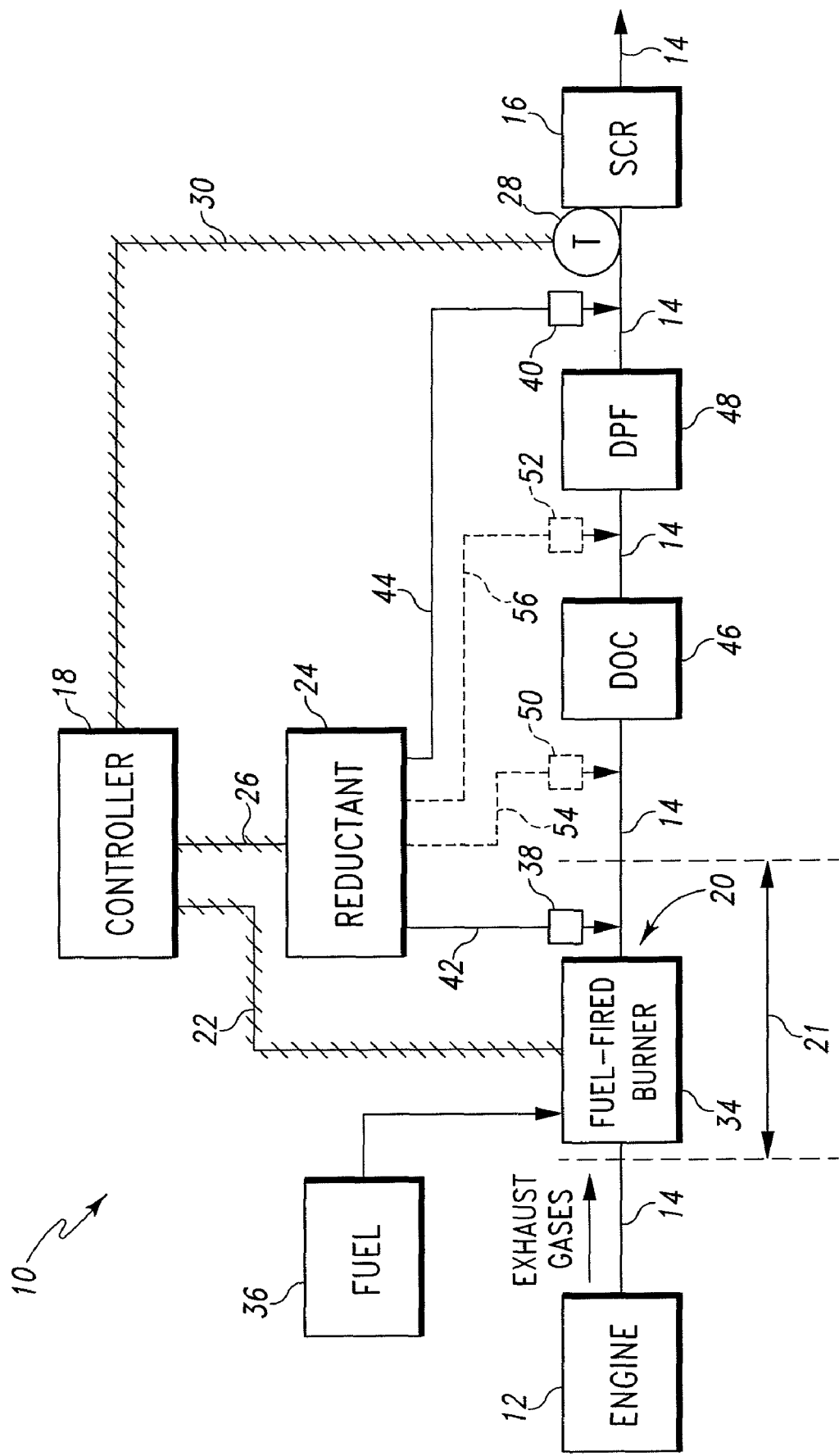
FIG. 2 is a diagrammatic of another emissions abatement system.

FIG. 2 shows another diagrammatic view of an emission abatement assembly 10. In the configuration shown in FIG. 2, the heat source 20 is a fuel-fired burner 34, which is supplied diesel fuel from a diesel fuel supply 36. The assembly 10 further includes a diesel oxidation catalyst (DOC) 46 along with a diesel particulate filter (DPF) 48. The SCR catalyst 16 is positioned downstream of both the DOC 46 and the DPF 48.

When the engine 12 is not generating exhaust gases high enough in temperature to make the catalyst 16 efficient for reducing NOx, the burner 34 can be operated by the controller 18 to produce temperatures along segment 21 of the exhaust path 14 high enough to allow reductant injected into the segment 21 to react with NOx present in the exhaust gases. In this exemplary embodiment, an injector 38 injects the reductant into segment 21. The controller 18 controls the timing of injection through control line 26.

During operation, when the exhaust gases reach a temperature that allows the catalyst 16 to efficiently catalyze a reaction between reductant and NOx, the reductant can be injected into the exhaust path 14 through the injector 40. This allows the reductant to be injected at a point more proximate to the catalyst 16 with respect to the injector 38. Thus, the injectors 38, 40 can be selected for use by the controller 18 based upon the temperature sensed by the sensor 28. It should be appreciated that the assembly 10 shown in FIG. 2 can operate in the absence of the injector 40. This allows the injector 38 to inject reductant into the segment 21 for non-catalyzed reaction with the NOx in the manner described. Also, when the exhaust gases have reached a temperature sufficient for the catalyst 16 to efficiently be used, reductant can be injected into the exhaust path 14 through the injector 38 allowing the injected reductant to flow downstream to the catalyst 16. Injectors 50 and 52 are shown as alternative reductant injection points along the exhaust path 14.

It should further be appreciated that the assembly shown in FIG. 2 can be utilized for regenerating the particulate filter 48. For example, if the reductant source 24 is embodied as a fuel reformer, the reformate gas produced thereby can be used to react with NOx in the segment 21 in the manner previously described. Furthermore, the reformate gas can also be supplied through the injector 38 (or the injector 50) to the DOC 46 allowing the reaction therein to generate enough heat for regeneration of the DPF 48. The fuel reformer may also be used to supply reductant to the catalyst 16 through the injector 38. Enough reformate may be supplied such that is not all consumed through an oxidation reaction catalyzed by the DOC 48, which allows the reformate to pass through the DOC 48 and react with NOx in the catalyst 16.

It should be further appreciated that the reductant can be added to the exhaust flow at other locations than those shown in FIG. 2. For example, a reductant can be injected into the combustion chambers (not shown) of the engine 12, which produces exhaust gases containing the reductant. The heat source 20 can be activated creating sufficient heat in the segment 21 for reaction between the reductant and NOx. Once the exhaust gases reach the segment 21, the reductant and NOx will react accordingly.

Figure 3:
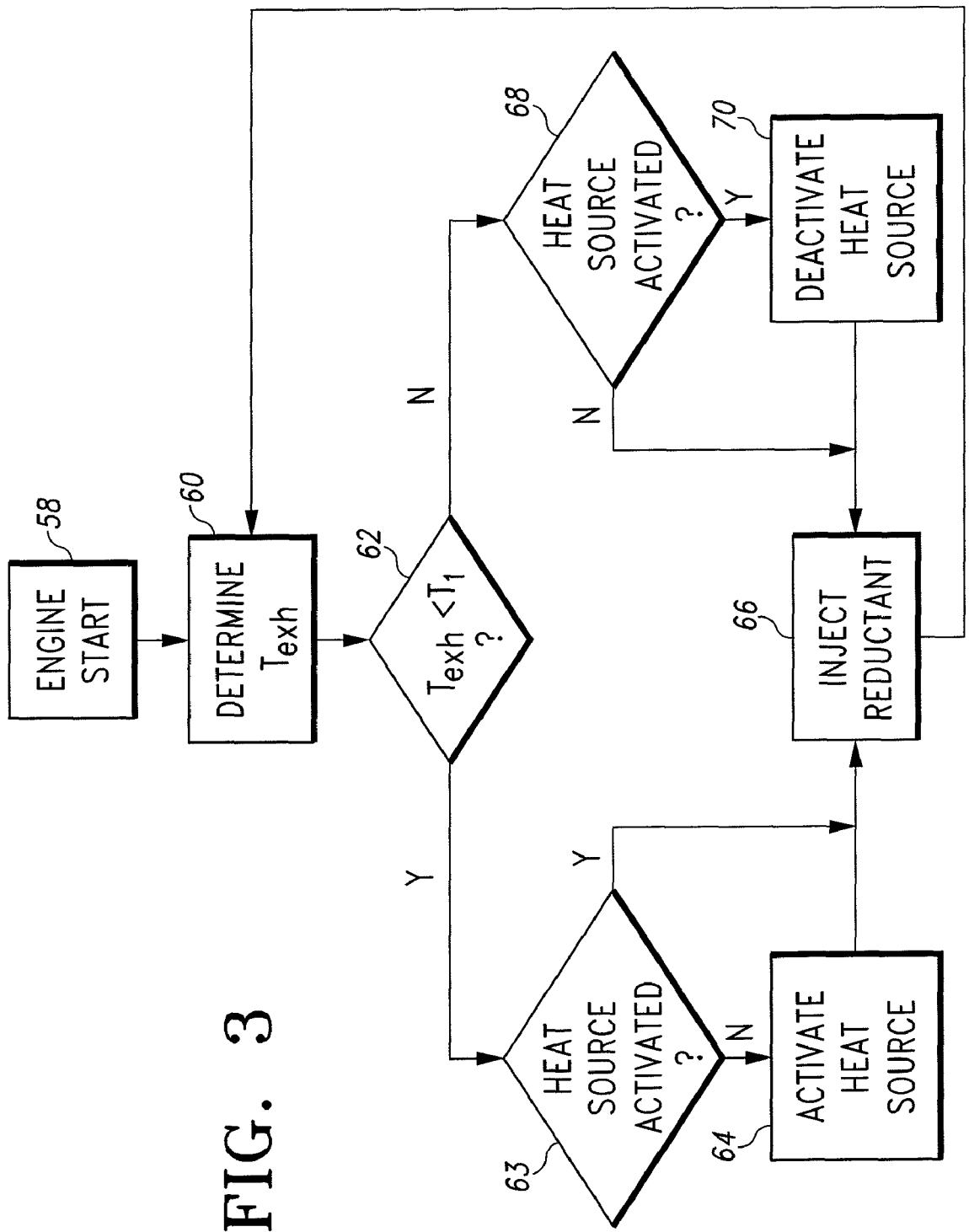
FIG. 3 is a flowchart for an exemplary control strategy for an exemplary emission abatement system.

FIG. 3 shows an exemplary control strategy for operating an emission abatement assembly 10 that can be carried out by a controller such as controller 18. At operation 58, the engine 12 is started. After the engine has started, the exhaust temperature, $T_{exh}$ is determined at operation 60. This can be determined through a temperature sensor such as the temperature sensor 28 shown in FIGS. 1 and 2. At operation 62, the exhaust temperature $T_{exh}$ is compared to a predetermined threshold temperature, $T_1$, which can be set the point at which the SCR catalyst 16 catalyzes at an efficient level. If the exhaust gas temperature $T_{exh}$ is less than the threshold temperature $T_1$, operation 63 is performed to determine if the heat source 20 has been activated. Initially, it will be inactive, thus requiring activation at operation 64. Once the heat source 20 is activated, or if already activated, the reductant is injected into segment 21 of the exhaust path 14 at operation 66.

As reductant is being injected, operation 60 is repeated to determine the exhaust gas temperature $T_{exh}$. This is compared to the threshold temperature $T_1$ at the operation 62. When the exhaust gas temperature $T_{exh}$ is greater than the threshold temperature $T_1$, operation 68 is performed, which determines if the heat source 20 is activated. If it is currently activated, operation 70 is performed to deactivate the heat source 20. If the heat source 20 has already been deactivated, operation 66 is performed, which requires reductant to be injected into the exhaust path 14 and conducted to the SCR catalyst 16. It should be appreciated that the operations shown in FIG. 3 can occur in the order described or can be rearranged for various configurations. It should be further appreciated that other operations can be included to implement various control strategy operations.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of apparatus, systems, and methods that incorporate one or more of the features of the present disclosure and fall within the spirit and scope of the present disclosure.

The invention claimed is:

1. A method of reducing NOx in exhaust gases generated by an internal combustion engine, comprising:

advancing the exhaust gases along an exhaust path to a selected catalytic reduction (SCR) catalyst positioned downstream from the internal combustion engine, activating a heat source if the exhaust gases are below a predetermined temperature, such that the exhaust gases along a segment of the exhaust path upstream of the SCR catalyst are heated to a temperature of 700-1000° C., positioning a first injector proximate to the heat source and positioning a second injector proximate to an emission abatement component, operating the first injector to inject reductant when the heat source is activated, and injecting reductant into the segment of the exhaust path to react in the segment with NOx in the exhaust gases while the heat source is activated until a sensed temperature reaches the predetermined temperature, and deactivating the heat source if the temperature of the exhaust gases at the catalyst rises above the first predetermined temperature; and operating the second injector to inject reductant when the heat source is deactivated.

2. The method of claim 1 further comprising:
advancing the reductant to the SCR catalyst after deactivation of the heat source.

3. The method of claim 1, wherein the injecting a reductant step comprises injecting urea at the segment of the exhaust path to react in the segment with NOx in the exhaust gases.

4. The method of claim 1, further comprising:
generating ammonia with an ammonia generator,
wherein, the injecting step comprises injecting ammonia at the segment of the exhaust path to react in the segment with NOx in the exhaust gases.

5. The method of claim 1, wherein the segment of the exhaust path is located upstream of the SCR catalyst.

6. . The method of claim 1 further comprising
continuously injecting reductant into the exhaust gases along the segment of the exhaust path until the predetermined temperature is achieved.

7. The method of claim 1, wherein the activating a heating source step comprises activating a fuel-fired burner to produce a flame to raise the temperature of the exhaust gases at the segment of the exhaust path to a temperature of 700-1000° C. if the temperature of the exhaust gases are below a first predetermined temperature.

8. The method of claim 7 further comprising controlling the temperature of the flame to 900° C.

9. The method of claim 7, wherein the injecting step comprises injecting the reductant proximate to the flame of the fuel-fired burner.

10. The method of claim 9, wherein the injecting step further comprises injecting the reductant proximate to the SCR catalyst when the fuel-fired burner has been deactivated.

11. An emission abatement assembly comprising:
a temperature sensor configured to sense the temperature of exhaust gases generated by an internal combustion engine,
a heat source positioned along an exhaust path downstream of the internal combustion engine,
a reductant source,
an injector positioned along the exhaust path downstream of the internal combustion engine and configured to inject reductant from the reductant source, and wherein the injector comprises a first and second injector, the first injector being positioned proximate to the heat source and the second injector being located proximate to an emission abatement component,
a selective catalytic (SCR) reduction catalyst positioned along the exhaust path downstream of the heat source, and
a controller electrically coupled to the temperature sensor, heat source, and the injector, wherein the controller comprises (i) a processor, and (ii) a memory device electrically coupled to the processor, the memory device having stored therein a plurality of instructions which, when executed by the processor, causes the processor to:
(a) monitor the temperature of the exhaust gases through the temperature sensor,
(b) activate the heat source to raise the temperature of the exhaust gases along a segment of the exhaust path upstream of the SCR catalyst to a temperature of 700-1000 C. if the temperature of the exhaust gases is below a first predetermined temperature,
(c) operate the injector to inject reductant along the exhaust path segment to react in the segment with NOx present in the exhaust gases while the heat source is activated until a sensed temperature reaches the predetermined temperature, and
(d) deactivate the heat source if the temperature of the exhaust gases rises above the first predetermined temperature,
(e) operate the first injector to inject reductant when the heat source is activated, and
(f) operate the second injector to inject reductant when the heat source is deactivated.

12. The emission abatement assembly of claim 11, wherein the reductant source is one of an ammonia generator, a urea source, or a fuel reformer.

13. The emission abatement assembly of claim 11, wherein:
the heat source is a fuel-fired burner, and
the plurality of instructions further causes the processor to:
(a) activate the fuel-fired burner to produce a flame, and
(b) control the flame to a temperature of 700-1000 C.

14. The emission abatement assembly of claim 11, wherein the heat source is one of an electric heater or a fuel fired burner.

15. A method of reducing NOx in exhaust gases generated by an internal combustion engine, comprising:
advancing the exhaust gases along an exhaust path to a selected catalytic reduction (SCR) catalyst positioned downstream from the internal combustion engine,
activating a heat source if the exhaust gases are below a predetermined temperature, such that the exhaust gases along a segment of the exhaust path upstream of the SCR catalyst are heated to a temperature of 700-1000° C.,
positioning at least two different injectors upstream of the SCR catalyst,
injecting a reductant into the segment of the exhaust path to react in the segment with NOx in the exhaust gases,
selectively operating the first and second injectors based on a sensed temperature and a determination of whether the heat source is activated or deactivated; and
deactivating the heat source if the temperature of the exhaust gases at the catalyst rises above the first predetermined temperature.

16. The method of claim 15 further comprising
positioning a diesel oxidation catalyst downstream of the heat source,
positioning a diesel particulate filter downstream of the diesel oxidation catalyst;
positioning the SCR catalyst downstream of the diesel particulate filter,
positioning the two different injectors downstream of the heat source, and
selectively operating the first and second injectors such that one of the first and second injectors injects reductant when the heat source is activated and the other of the first and second injectors injects reductant when the heat source is deactivated.

17. The method of claim 15, wherein the activating a heating source step comprises activating an electric heater to raise the temperature of the exhaust gases to a temperature of 700-1000° C. along the segment if the temperature of the exhaust gases are below a first predetermined temperature, and wherein the reductant source is one of an ammonia generator, a urea source, or a fuel reformer.

18. The method of claim 17, wherein the injecting step comprises injecting the reductant proximate to the electric heater.

19. An emission abatement assembly comprising:
  a temperature sensor configured to sense the temperature of exhaust gases generated by an internal combustion engine,
  a heat source positioned along an exhaust path downstream of the internal combustion engine,
  a reductant source,
  at least two different injectors positioned along the exhaust path downstream of the internal combustion engine and upstream of the SCR catalyst, the injectors configured to inject reductant from the reductant source,
  a selective catalytic (SCR) reduction catalyst positioned along the exhaust path downstream of the heat source,
  a controller electrically coupled to the temperature sensor, heat source, and the injector, wherein the controller comprises (i) a processor, and (ii) a memory device electrically coupled to the processor, the memory device having stored therein a plurality of instructions which, when executed by the processor, causes the processor to:
    (a) monitor the temperature of the exhaust gases through the temperature sensor,
    (b) activate the heat source to raise the temperature of the exhaust gases along a segment of the exhaust path upstream of the SCR catalyst to a temperature of 700-1000 C. if the temperature of the exhaust gases is below a first predetermined temperature,
    (c) selectively operate the first and second injectors to inject reductant along the exhaust path segment to react in the segment with NOx present in the exhaust gases based on a temperature sensed by the temperature sensor and a determination of whether the heat source is activated or deactivated, and
    (d) deactivate the heat source if the temperature of the exhaust gases rises above the first predetermined temperature.

20. The emission abatement assembly of claim 19, including a diesel oxidation catalyst positioned downstream of the heat source and a diesel particulate filter positioned downstream of the diesel oxidation catalyst, and wherein the SCR catalyst is positioned downstream of the diesel particulate filter, and wherein the two different injectors are positioned downstream of the heat source, and
  the plurality of instructions further causes the processor to:
  selectively operate the first and second injectors such that one of the first and second injectors injects reductant when the heat source is activated and the other of the first and second injectors injects reductant when the heat source is deactivated.

* * * * *